United States Patent [19]

Conforti

[11] Patent Number: 4,894,769

[45] Date of Patent: * Jan. 16, 1990

[54] INCREASED BANDWITH FOR MULTI-PROCESSOR ACCESS OF A COMMON RESOURCE

[75] Inventor: Joseph A. Conforti, Phoenix, Ariz.

[73] Assignee: AG Communication Systems Corporation, Phoenix, Ariz.

[*] Notice: The portion of the term of this patent subsequent to Sep. 27, 2005 has been disclaimed.

[21] Appl. No.: 17,385

[22] Filed: Feb. 20, 1987

[51] Int. Cl.$^4$ .................. G06F 13/00; G06F 13/14
[52] U.S. Cl. ........................... 364/200; 364/242.6
[58] Field of Search ... 364/200 MS File, 900 MS File

[56] References Cited

U.S. PATENT DOCUMENTS

| | | | |
|---|---|---|---|
| 4,363,096 | 12/1982 | Comfort et al. | 364/200 |
| 4,374,413 | 2/1983 | Comfort et al. | 364/200 |
| 4,374,414 | 2/1983 | Comfort et al. | 364/200 |
| 4,376,975 | 3/1983 | Comfort et al. | 364/200 |
| 4,394,728 | 7/1983 | Comfort et al. | 364/200 |
| 4,563,738 | 1/1986 | Klan | 364/200 |
| 4,597,054 | 6/1986 | Lockwood et al. | 364/900 |
| 4,773,037 | 9/1988 | Conforti | 364/900 |
| 4,774,660 | 9/1988 | Conforti | 364/200 |

Primary Examiner—Gary V. Harkcom
Assistant Examiner—Michael A. Jaffe
Attorney, Agent, or Firm—Anthony Miologos

[57] ABSTRACT

This circuitry permits equal access to a shared resource by a number of central processing units (CPUs). In a multiple CPU arrangement, common resource contention problems arise, when several CPUs attempt to access the common resource. To resolve these contention problems, this circuitry is an improvement to arbitration ring circuitry. The circuitry of this invention permits each of the CPUs equal access to the common resource during situations in which each CPU is constantly generating requests (high bandwith utilization) for access to the common resource. This invention is particularly useful for systems in which a large number of CPUs must have their local memory rapidly reloaded from a common memory source. Reloading procedures for large numbers of CPUs require up to an hour. By employing the present invention, these reloading times can be cut from one hour to approximately 5 minutes.

18 Claims, 1 Drawing Sheet

INCREASED BANDWITH FOR MULTI-PROCESSOR ACCESS OF A COMMON RESOURCE

CROSS REFERENCE TO RELATED APPLICATIONS

The present application is related to co-pending U.S. patent applications Ser. Nos. 17,384 and 17,383, now U.S. Pat. Nos. 4,773,037 and 4,774,660 respectively both having the same inventive entity and being assigned to the same assignee as the present application.

BACKGROUND OF THE INVENTION

The present invention pertains to multiple central processing unit (CPU) controlled real-time systems and more particularly to a scheme for increasing the bandwidth for each CPU of a multi-processor configuration for accessing a commonly shared resource.

Computerized control of telecommunication systems is known in the art. Modern telecommunication systems require vast amounts of processing power in order to provide the varied telecommunication functions commonly in use. Distributed processing or load sharing among CPUs is now common place in large real time systems. The telecommunications industry is no exception to this rule.

In a distributed processing system, CPUs exchange information via a common resource or memory. In this way, the system's tasks may be divided among the available CPUs. Such a system also avoids multiple CPUs initiating the same task by granting access to the common resource or memory to only one CPU at a particular time.

Therefore, when several CPUs attempt to access the common resource or memory, a selection arrangement must allow only one CPU to access the common resource or memory at a time. This hardware is termed contention resolution or arbitration circuitry. One such arbitration controller is shown in U.S. Pat. No. 4,363,096, for an invention entitled *Arbitration Controller Providing For Access of A Common Resources By a Duplex Plurality Of Central Processing Units.* This patent was issued on Dec. 7, 1982, to the same assignee as that of the present application. U.S. Pat. No. 4,363,096, is hereby incorporated by reference. U.S. Pat. No. 4,376,975, issued on Mar. 15, 1983, also teaches this arbitration scheme. This Patent is entitled *Arbitration Controller Providing For Access of A Common Resources by a Plurality of Central Processing Units.* This patent is also incorporated by reference.

The above mentioned Patents teach an arbitration circuit which grants access to a common resource to one of a group of CPUs. The number of CPUs in this group may be up to sixteen CPUs. The arbitration scheme employed in these Patents is to circulate granting request to the common resource among the CPUs on a rotational basis (i.e. CPU0 first; CPU1 second; ... CPU15 then CPU0 again).

The configuration shown in the U.S. Patents mentioned above was designed to handle telecommunication events which typically occur at the rate of 10 milliseconds per event. In situations where there is constant CPU contention for the common resource (i.e. CPUs simultaneously requesting) and when events occur on an average of approximately 10 millisecond intervals, CPU contentions are easily resolved within this time frame, since the available bandwidth is 666 nsec. This arbitration logic was designed in this fashion and worked well to allow multiple processors access to the common resource for telecommunication functions which occurred at approximately 10 millisecond rate.

Public policy requires telecommunication functions including telephone service to operate 24 hours a day continuously without a disruption of service. Therefore, highly reliable telecommunication systems are required. In the above mentioned Patents, each CPU or processor has associated with it local memory. This local memory contains the operating instructions for each CPU. If this local memory becomes mutilated, the processors may not operate efficiently, if at all.

For a telecommunication system outage, no telephone services are provided. Such conditions must be quickly rectified. During outages in the system which employs the above mentioned Patents, reloading the local memory of a CPU from the common memory requires approximately 1 hour. This means that those telecommunication functions and telephone subscribers served by this processor are potentially without service for up to 1 hour.

Improvements were made to the system software which loaded processors whose local memory had become mutilated. This system software is able to reload a processor's local memory very quickly by constantly generating requests for access to the common resource with a frequency of request of approximately 1 request per 666 nanoseconds.

For the duration of the reloading process, each CPU was constantly generating a request for access to the common resource. Due to the rotational scheme employed by the arbitration circuitry of the above mentioned patents, the CPU access bandwidth (frequency of access through the arbitration logic) was found to be insufficient to accommodate the 666 nanosecond bandwidth of multiple constantly requesting CPUs.

A fully equipped group of CPUs along with associated arbitration circuitry includes up to 9 printed wiring cards (PWCs). Since there are two copies of each CPU and arbitration circuit operating in duplex, a fully equipped CPU group may include up to 18 PWCs.

Originally, it was believed that a complete redesign of the arbitration circuitry would be required to accommodate this fast reloading procedure. In addition, it was believed that each of the printed wiring cards would require redesign and relayout. The redesign and relayout functions are extremely costly and require considerable amounts of engineering time and effort.

It, therefore, is an object of the present invention to allow constant access to a common resource by a large number of CPUs, thereby increasing the bandwidth of the CPU/common resource interface, while requiring minimal circuit and engineering changes to the circuitry shown in the above mentioned Patents.

SUMMARY OF THE INVENTION

In accomplishing the object of the present invention, there is provided a novel arbitration scheme embodying minimal changes to a previously designed arbitration circuit for rapid local memory reloading by a number of CPUs.

An arbitration controller provides for equal priority sharing of duplicate copy resources by active ones of first and second pluralities of duplicate pairs of CPUs. The arbitration controller includes first and second initialization circuits each for providing an initialization signal.

The arbitration controller also includes first and second pluralities of arbitration circuits. Each plurality of arbitration circuits includes a first, at least one successive and a last arbitration circuit. Each initialization circuit is connected to at least one of the corresponding plurality of arbitration circuits.

The arbitration controller also has first and second groups of CPU buses, Each of the buses of the first group is connected to a particular one of the buses of the second group. Each of the buses of the second group is connected to a particular one of the buses of the first group.

The arbitration controller also has first and second common buses. Each common bus is connected between a corresponding CPU and a particular one of the duplicate copy resources via a corresponding arbitration circuit. There are first and second groups of circuit connections included in the arbitration controller. Each group of circuit connections includes a connection between the first arbitration circuit and each successive arbitration circuit and the last arbitration circuit. The last arbitration circuit is also connected to the first arbitration circuit of its respective group. Thereby a ring connection of arbitration circuits is formed. The arbitration circuits propagate the initialization signal through the ring connection synchronously. Where arbitration circuit of each plurality operates to access the duplicate copy resources simultaneously.

Each arbitration circuit has a first arbitration gate which is operated to propagate the initialization signal along the ring connection at a relatively high rate of speed. Each arbitration circuit also has an arbitration latch connected to the first arbitration gate. The arbitration latch produces a signal which permits the active CPU the access duplicate copy resources. Each arbitration circuit also includes a second arbitration gate which is connected to the arbitration latch. The second arbitration gate propagates a third signal through said arbitration ring connection.

The improvement to the arbitration controller includes a clock for generating a clock signal of a predetermined frequency. A detector recognizes simultaneous access requests of two CPUs. The detector is connected to the corresponding first and second arbitration circuits. It operates to produce a contention signal.

The improvement also includes a disabling arrangement. The disabling arrangement is connected to the detector, to the corresponding first and second arbitration circuits and to the clock. The disabling arrangement operates in response to an indication that the first CPU was previously granted access to the resources and to the contention signal to inhibit transmission of the clock signal to the arbitration circuit corresponding to the second CPU.

the improvement further includes an enabling arrangement. The enabling arrangement is connected to the detector, to the first and second arbitration circuits and to the clock. The enabling arrangement operates in response to the contention signaling and to an indication that the first CPU was previously granted access to the resources to transmit the clock signal to the arbitration circuit corresponding to the second CPU.

A BRIEF DESCRIPTION OF THE DRAWINGS

FIG. 1 is a schematic diagram of the improvements made to the arbitration circuitry embodied in the present invention.

DESCRIPTION OF THE PREFERRED EMBODIMENT

Figure 1:
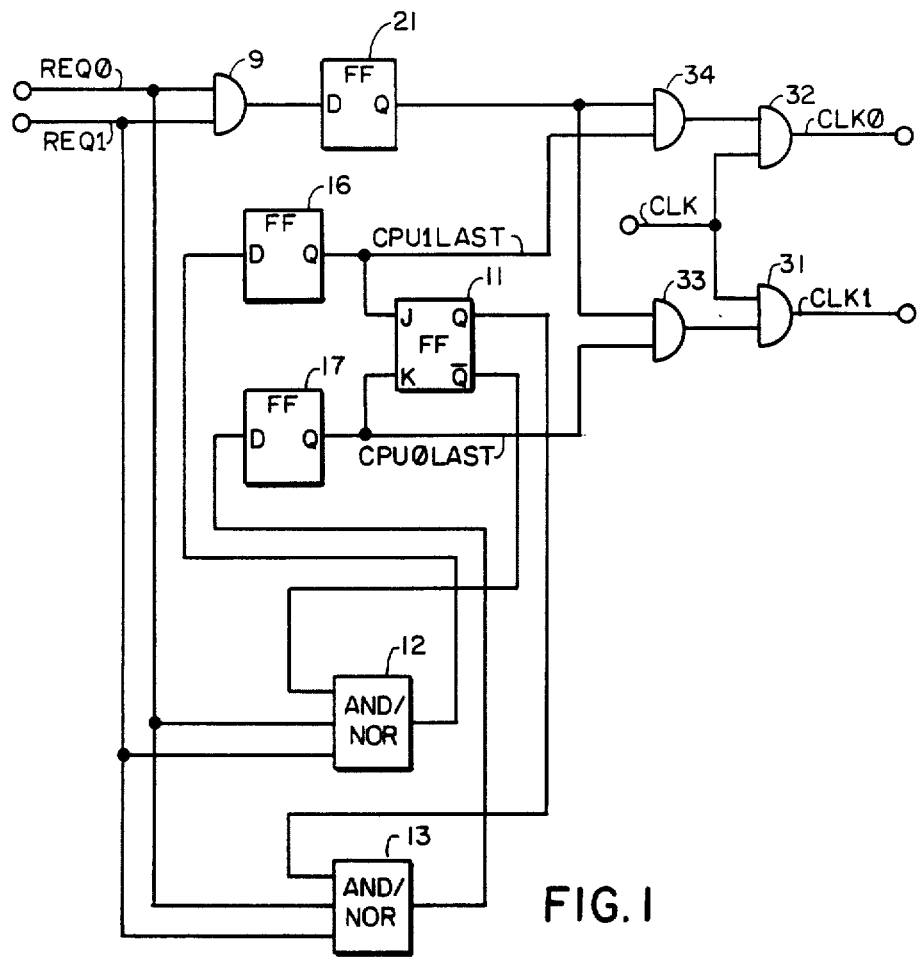

A ring or circular structure chosen to represent arbitration ring and indicates that access to the memory is granted to simultaneously requesting CPUs on a rotational basis. That is, access is granted first CPU0, then CPU1, and so forth up to CPU 15, then access is returned back to CPU0.

Referring to FIG. 2 of the above mentioned U.S. Patents, the arbitration ring circuitry for each subgroup is shown. The grant signal (grant 0 through grant 15) is connected to the corresponding CPU (CPU0 through CPU 15) via the corresponding GRANT lead. The explanation of the arbitration ring circuitry and the improvements thereto will be shown for the arbitration ring of one subgroup operating in the simplex mode. The arbitration ring operates synchronously for the duplex mode as taught in U.S. Pat. No. 4,363,096. It is to be noted that the arbitration ring has arbitration circuits connected to corresponding CPUs and that the grant signal is passed from one arbitration circuit to the next as a function of the clock (CLK) signal.

For example, on the first clock cycle, flip-flop 201 will be clocked. As a result, J-K flip-flop 204 will produce the grant signal to enable CPU0 to access the memory. The GRANT signal enables the next arbitration circuit corresponding to CPU1 to receive access to the memory upon the next clock signal via the CLK lead. This scheme of passing the grant signal continues on each clock cycle, transmitting the grant signal to each of the arbitration circuits corresponding to the CPUs, until arbitration circuit 15 is reached.

Arbitration circuit 15 includes D-type flip-flop 351 gates 352, 353, and 355, and J-K flip-flop 354. After arbitration circuit 15 has granted CPU 15 access to the common memory, the grant signal is passed back from gate 350 to gate 202. On the next clock cycle, a signal on the CLK lead enables arbitration circuit 0 to give control to CPU0, thereby completing the ring. This circular rotation of the grant signal between arbitration circuits gives rise to the name arbitration ring.

Referring to FIG. 1 of this application, the circuitry for constant CPU contention arbitration is shown. It is assumed that CPU0 and CPU1 are constantly requesting memory access. The resource request signals supplied via the REQ0 and REQ1 leads are the request signals from two contending CPUs. These signals are transmitted via their respective leads to AND gate 9 and to combination AND/NOR gates 12 and 13. Gate 9 is connected to the D-input of flip-flop 21. The Q output of flip-flop 21 is connected to AND gates 33 and 34. AND gate 34 is connected to AND gate 32. AND gate 33 is connected to AND gate 31. AND gate 32 produces the CLK0 signal on the corresponding lead. This signal is used to operate the arbitration ring logic in advancing the grant signal among the CPUs beginning with CPU0. Similarly, the CLK1 signal transmitted via the corresponding lead operates the arbitration ring logic to advance the grant signal among the CPUs beginning with CPU1.

The Q-bar and Q outputs of J-K flip-flop 11 are connected to AND/NOR combination gates 12 and 13, respectively. The output of combination gate 12 is connected to the D-input of D-type flip-flop 16. The output of combination gate 13 is connected to the D-input of D-type flip-flop 17. The Q output of flip-flop 17 is connected to the J-input of flip-flop 11 and to an input of AND gate 34.

The Q output of flip-flop 16 on the CPU1LAST lead is a signal indicating that CPU1 was the last CPU to be given access to the common resource. The Q output of D-type flip-flop 17 is connected to the K-input of flip-flop 11 and to AND gate 33. The Q output of flip-flop 17 on the CPU0LAST lead indicates that CPU0 was the last CPU to be given access to the common resource. The system clock (not shown) is connected to AND gates 31 and 32 via the CLK lead.

Referring to FIG. 2 of the above mentioned U.S. Patents, the system clock is connected directly via the CLK lead to flip-flops 201, 211 ... 351. The CLK signal is not connected to each of the J-K flip-flops in the present configuration. The CLK is selectively gated to those flip-flops not requiring constant memory access. The CLK0 and CLK1 signals are transmitted to those CPUs having a need for constant memory access. In FIG. 1 of the present application, the circuitry is connected between the system clock via the CLK lead and each of the above mentioned flip-flops of FIG. 2 of the referenced U.S. Patents. The action of the circuit of FIG. 1 of the present application inhibits the arbitration circuit corresponding to the CPU which was not granted access to the common resource from advancing its GRANT signal. Therefore, this CPU will get access to the memory next. The circuit of FIG. 1 of the present application inhibits clock pulses from advancing one of the D-type flip-flops 201, 211 ... 351 corresponding to the CPU which was not granted access to the memory.

Referring to FIG. 1 of the present application, gate 9 receives requests from each of the CPU requiring constant access to the memory or common resource. Since it is assumed that a contention situation exists, both signals CPU0REQ and CPU1REQ will be at logic 1. As a result, gate 9 is enabled and flip-flop 21 becomes set (logic 1). The Q output of flip-flop 21 is transmitted to AND gates 33 and 34. If there is contention between any two CPUs for the common resource, both gates 33 and 34 will have their upper input set to logic 1 due to the Q output of flip-flop 21.

J-K flip-flop 11 operates as a toggle switch to alternately pass control of access of the common resource between CPU0 and CPU1. Again, assuming that there is a contention situation, both the REQ0 and REQ1 signals are at logic 1. Since flip-flop 11 is either in the set or reset state, the values of the outputs Q and Q-bar of flip-flop 11 will be either logic 0 and logic 1, respectively or logic 1 and logic 0, respectively. If it is assumed that CPU was granted access to the common resource last, the Q output of flip-flop 11 will be set and the Q-bar output will be reset. As a result, combination gate 12 produces a logic 1 output which is transmitted to flip-flop 16 where it is latched and stored. The Q output of flip-flop 16 is now at logic 1.

Since CPU0 was the last CPU to be given access to the common resource, CPU1 should be granted access this time according to the scheme. The Q output of flip-flop 16, which is at logic 1, is transmitted to gate 34. Gate 34 is operated and causes gate 32 to operate upon the next clock signal on the CLK lead. This clock signal is transmitted to CPU0 via the CLK0 lead. This signal will operate the flip-flop, mentioned in FIG. 2 of the referenced U.S. Patents, corresponding to CPU0 to advance the grant signal to CPU1.

Since the Q-bar output of flip-flop 11 is reset, combination gate 13 will produce a logic 0 at its output. As a result, flip-flop 17 will latch and store a logic 0. Therefore the Q output of flip-flop 17 will be at logic 0. As a result, gate 33 will be inhibited from operation. On the next clock cycle, the clock signal on the CLK lead will not be transmitted through gate 31 to the CPU flip-flop shown in FIG. 2 of the referenced U.S. Patents. As a result, these flip-flop will not advance the grant signal. The next CPU to be given control will be the opposite one given control in the last memory access, i.e. CPU1.

Those CPUs requiring normal memory access receive the basic system CLK gated to them to advance the grant signal. Therefore, each of the 16 CPUs is able to have its local memory reloaded very rapidly without ignoring the requests of any of the CPUs. IT should be noted that for the non-contention case or for the case in which every CPU is not requesting access, the circuit of FIG. 1 still permits proper arbitration between the CPUs.

Lastly, on the next arbitration contention situation, flip-flop 11 has been toggled. Since CPU1 was granted memory access during the last contention situation, the circuitry of FIG. 1 operates to grant access to CPU0, next.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In combination with an arbitration controller which provides for equal priority sharing of duplicate copy resources by active ones of first and second pluralities of duplicate pairs of CPUs, said arbitration controller including first and second means for initialization each providing for a first signal; corresponding first and second pluralities of arbitration circuits, each plurality of arbitration circuits including a first, at least one successive and a last arbitration circuit; each of said means for initialization being connected to at least one of said corresponding plurality of arbitration circuits; first and second pluralities of CPU buses, each of said CPU buses of said first plurality of CPU buses connected to a respective one of said CPU buses of said second plurality of CPU buses and each of said CPU buses of said second plurality of CPU buses connected to a respective one of said CPU buses of said first plurality of CPU buses; first and second common buses, each common bus connected between an associated and corresponding one of said first and second pluralities of duplicate pairs of CPUs and a respective one of said duplicate copies of said resources via a corresponding one of said plurality of arbitration circuits; first and second pluralities of circuit connections, each of said plurality of circuit connections including a circuit connection between each said first arbitration circuit and each successive arbitration circuit, said last arbitration circuits being connected to said first arbitration circuit of its respective plurality of arbitration circuits forming ring connections and each arbitration circuit propagating said first signal through said ring connections; one arbitration circuit of each plurality of arbitration circuits operated in response to said first signal and to a common bus request signal from an active CPU to access each of said duplicate copy resources simultaneously; and each arbitration circuit including: first arbitration gating means being operated to propagate said first signal along said ring connections at a high rate of speed; arbitration latching means connected to said first arbitration gating means and being operated to produce a second signal for allowing said active CPU to access said duplicate resources; and second arbitration gating means connected to said arbitration latching means and being operated to propagate a third signal from one said arbitration circuit to a next successive arbitration circuit for said ring connection; the improvement comprising:

clock means for generating a clock signal of a predetermined frequency;

means for detecting simultaneous access requests of a first and a second CPU of said first and second pluralities of duplicate pairs of CPUs respectively, said means for detecting being connected to a corresponding and respective arbitration circuit of said first and second plurality of arbitration circuits and being operated in response to said simultaneous access requests to produce a contention signal;

means for disabling connected to said means for detecting, to a corresponding and respective arbitration circuit of said first and second plurality of arbitration circuits and to said clock means, said means for disabling being operated in response to said contention signal and to an indication that said first CPU was previously granted access to said resources, to inhibit transmission of said clock signal to said arbitration circuit of said second plurality of arbitration circuits corresponding to said second CPU; and means for enabling connected to said means for detecting, to a corresponding and respective arbitration circuit of said first and second plurality of arbitration circuits and to said clock means, said means for enabling being operated in response to said contention signal and to an indication that said first CPU was previously granted access to said resources, to transmit said clock signal to said arbitration circuit of said second plurality of arbitration circuits corresponding to said second CPU.

2. The improvement as claimed in claim 1, wherein there is further included first gating means connected to a respective arbitration circuit of said first and second plurality of arbitration circuits corresponding to said first and to said second CPUs, said first gating means being operated in response to said simultaneous access requests to produce last granted access signals, said last granted access signals indicating which CPU was previously granted access to the resources.

3. The improvement as claimed in claim 2, wherein there is further included memory means connected to said first gating means, to said means for disabling and to said means for enabling, said memory means being operated to store values representing said last granted access signals.

4. The improvement as claimed in claim 3, wherein there is further included switching means connected to said memory means and to said first gating means, said switching means being operated to reverse the values of said last granted access signals between said first and second CPUs.

5. The improvement as claimed in claim 4, said means for detecting including:

second gating means connected to a respective arbitration circuit of said first and second plurality of arbitration circuits corresponding to said first and said second CPUs; and latching means connected to said second gating means and being operated to store said contention signal.

6. The improvement as claimed in claim 5, said means for disabling including:

third gating means connected to said latching means and to said memory means; and fourth gating means connected to said third gating means, to said clock means and to a respective arbitration circuit of said first plurality of arbitration circuits corresponding to said first CPU.

7. The improvement as claimed in claim 6, said means for enabling including:

fifth gating means connected to said latching means and to said memory means; and sixth gating means connected to said fifth gating means, to said clock means and to a respective arbitration circuit of said second plurality of arbitration circuits corresponding to said second CPU.

8. The improvement as claimed in claim 7, said first gating means including:

first combination gating means connected to a respective arbitration circuit of said first and second plurality of arbitration circuits of said corresponding first and second CPUs, to said memory means and to said switching means; and second combination gating means connected to a respective arbitration circuit of said first and second plurality of arbitration circuits of said corresponding first and second CPUs, to said memory means and to said switching means.

9. The improvement as claimed in claim 8, said first and second combination gating means each including AND/NOR combination gating means.

10. The improvement as claimed in claim 9, said memory means including:

first storage means connected to said first combination gating means, to said switching means, to said means for enabling and to said means for disabling; and second storage means connected to said second combination gating means, to said switching means, to said means for enabling and to said means for disabling.

11. The improvement as claimed in claim 10, said first and second storing means each including D-type flip-flop means.

12. The improvement as claimed in claim 11, said switching means including J-K flip-flop means connected to said first and second storage means and to said first and second combination gating means.

13. The improvement as claimed in claim 12, said latching means including D-type flip-flop means.

14. The improvement as claimed in claim 13, said second gating means including AND gating means.

15. The improvement as claimed in claim 14, said third gating means including AND gating means.

16. The improvement as claimed in claim 15, said fourth gating means including AND gating means.

17. The improvement as claimed in claim 16, said fifth gating means including AND gating means.

18. The improvement as claimed in claim 17, said sixth gating means including AND gating means.

* * * * *